US008829790B2

(12) United States Patent
Yee

(10) Patent No.: US 8,829,790 B2
(45) Date of Patent: *Sep. 9, 2014

(54) ORGANIC LIGHT EMITTING DIODE (OLED) DISPLAY HAVING A REINFORCING MEMBER

(75) Inventor: Dong-Su Yee, Yongin (KR)

(73) Assignee: Samsung Display Co., Ltd., Gyeonggi-do (KR)

(*) Notice: Subject to any disclaimer, the term of this patent is extended or adjusted under 35 U.S.C. 154(b) by 339 days.

This patent is subject to a terminal disclaimer.

(21) Appl. No.: 13/047,639

(22) Filed: Mar. 14, 2011

(65) Prior Publication Data

US 2012/0098736 A1   Apr. 26, 2012

(30) Foreign Application Priority Data

Oct. 22, 2010   (KR) .................. 10-2010-0103546

(51) Int. Cl.
*G09G 3/30* (2006.01)
*H01L 51/52* (2006.01)

(52) U.S. Cl.
USPC ........... 313/512; 313/504; 313/506; 313/511; 361/679.26; 361/829

(58) Field of Classification Search
CPC ... H01L 51/00; H01L 51/524; H01L 51/5243; H01L 51/5246; H01L 2251/5361; H01L 2251/5338; G02F 1/133; G02F 1/133308; G06F 1/16; G06F 1/1626

USPC ................................................... 313/504–512
See application file for complete search history.

(56) References Cited

U.S. PATENT DOCUMENTS

| 8,044,586 B2 * | 10/2011 | Wang et al. .................... 313/512 |
| 8,315,070 B2 * | 11/2012 | Yee et al. ....................... 361/829 |
| 2005/0052827 A1 * | 3/2005 | Kim ............................. 361/638 |
| 2008/0284940 A1 * | 11/2008 | Choi ............................... 349/60 |
| 2009/0168318 A1 * | 7/2009 | Moon et al. ............. 361/679.21 |
| 2009/0195973 A1 * | 8/2009 | Yee et al. ................ 361/679.21 |

FOREIGN PATENT DOCUMENTS

| KR | 10-0889532 B1 | 3/2009 |
| KR | 10-0918054 B1 | 9/2009 |
| KR | 10-0918055 B1 | 9/2009 |

* cited by examiner

*Primary Examiner* — Sikha Roy
(74) *Attorney, Agent, or Firm* — Knobbe, Martens, Olson & Bear, LLP

(57) ABSTRACT

An organic light emitting diode (OLED) display is disclosed. In one embodiment, the display includes 1) a display panel including i) a display area configured to display an image and ii) a pad area adjacent to the display area and configured not to display an image, 2) a bezel configured to receive the display panel and 3) a reinforcing member positioned between the pad area of the display panel and the bezel. According to at least one embodiment, the deformation of the portion corresponding to the pad area of the display panel among the bezel may be prevented during an external impact, and thereby the twisting strength and the bending strength may be improved.

10 Claims, 2 Drawing Sheets

ORGANIC LIGHT EMITTING DIODE (OLED) DISPLAY HAVING A REINFORCING MEMBER

RELATED APPLICATION

This application claims priority to and the benefit of Korean Patent Application No. 10-2010-0103546 filed in the Korean Intellectual Property Office on Oct. 22, 2010, the entire contents of which are incorporated herein by reference.

BACKGROUND

1. Field

The described technology generally relates to an organic light emitting diode (OLED) display.

2. Description of the Related Technology

An organic light emitting device includes two electrodes and an organic light emitting layer interposed between the two electrodes. One of the two electrodes injects holes and the other injects electrons into the light emitting member. The injected electrons and holes are combined to form excitons and the excitons emit light as discharge energy.

SUMMARY

One inventive aspect is an organic light emitting diode (OLED) display that is impact-resistant.

Another aspect is an organic light emitting diode (OLED) display which includes a display panel including a display area and a pad area, a bezel receiving the display panel, and a reinforcing member positioned between the pad area of the display panel and the bezel.

The lower surface of the pad area of the display panel and the upper surface of the reinforcing member may be separated from each other by a predetermined interval.

A cushioning tape positioned between the display area of the display panel and the bezel may be further included.

The bezel may include a bottom portion and a side wall portion protruded from the edge of the bottom portion, and the reinforcing member may be in contact with the bottom portion.

The reinforcing member may be enclosed by the cushioning tape and the side wall portion of the bezel.

The reinforcing member may include a material selected from a group of stainless steel, steel plate cold commercial, aluminum, an aluminum alloy, and a nickel alloy.

DETAILED DESCRIPTION

Figure 1:
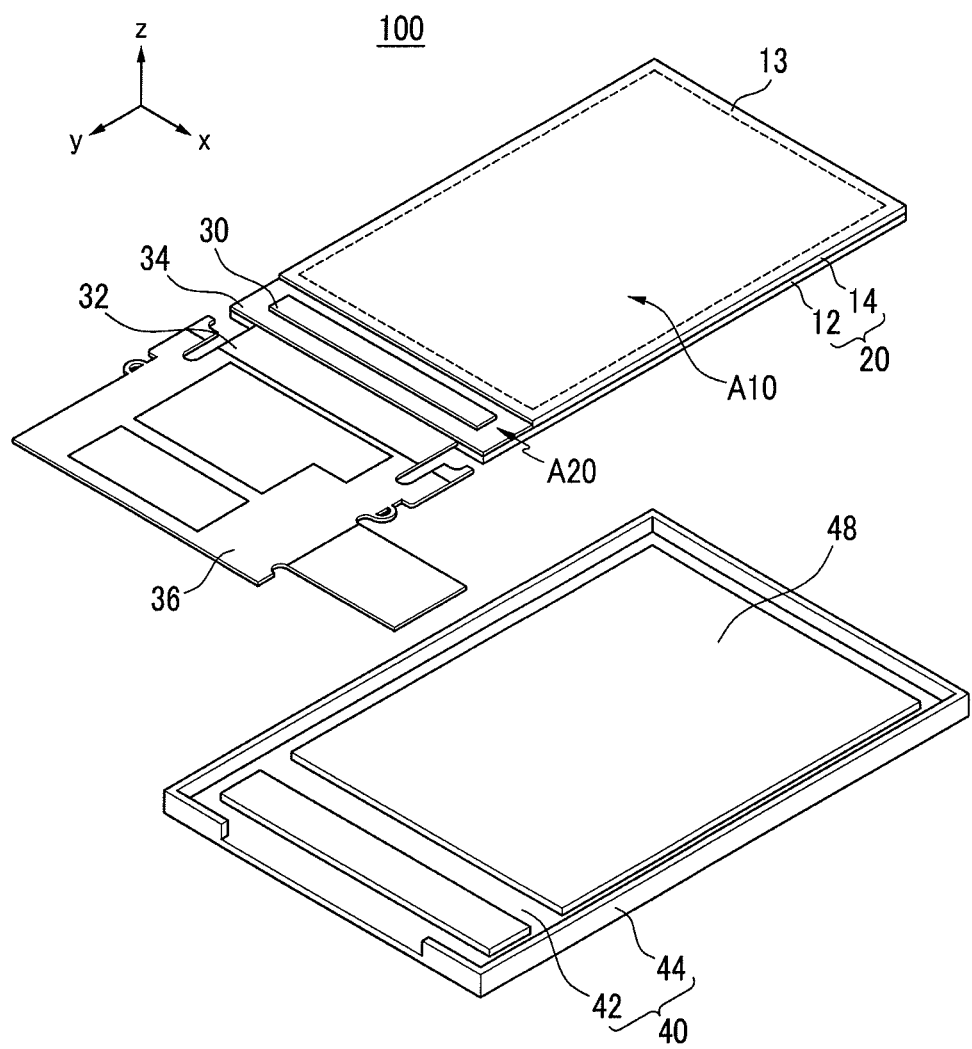
FIG. 1 is an exploded perspective view of an organic light emitting diode (OLED) display according to an embodiment.

An organic light emitting diode (OLED) display generally includes i) two substrates that are fixed by a sealant, ii) a display panel having a display area and a pad area, iii) a bezel combined to the display panel, and iv) a flexible printed circuit (FPC) electrically connected to the display panel through a flexible printed circuit board (FPCB).

Unlike an LCD in which a structure such as a backlight unit is positioned between the display panel and the bezel, in the OLED, because no structure exists between the display panel and the bezel, an impact is directly transmitted to the display panel in a sudden situation such as the device being dropped, whereby the display panel may be easily damaged.

Particularly, the lateral wall of the bezel is omitted at the portion where the flexible circuit board is contacted such that twisting strength and bending strength at the portion corresponding to the pad area of the display panel among the bezel is reduced.

Accordingly, if a user drops the organic light emitting diode (OLED) display during usage, a large twist load and a large bend load instantaneously act at the portion corresponding to the pad area of the display panel among the bezel such that the bezel is deformed. As a result, the twist load and the bend load are transmitted to the display panel combined to the bezel as it is such that the display panel may be easily damaged.

Embodiments will be described more fully hereinafter with reference to the accompanying drawings. As those skilled in the art would realize, the described embodiments may be modified in various different ways.

Further, like reference numerals designate like elements throughout the specification.

The size and thickness of each of elements that are displayed in the drawings are described for better understanding and ease of description, and the present invention is not limited by the described size and thickness.

Next, a display device according to an embodiment will be described with reference to FIG. 1 to FIG. 3.

Figure 2:
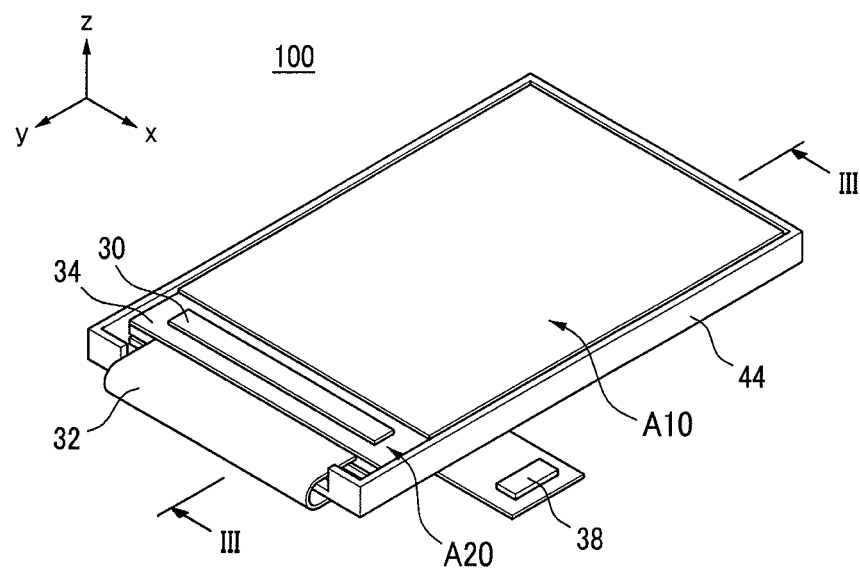
FIG. 2 is a perspective view showing a state in which a display panel is received at a bezel in FIG. 1.
Figure 3:
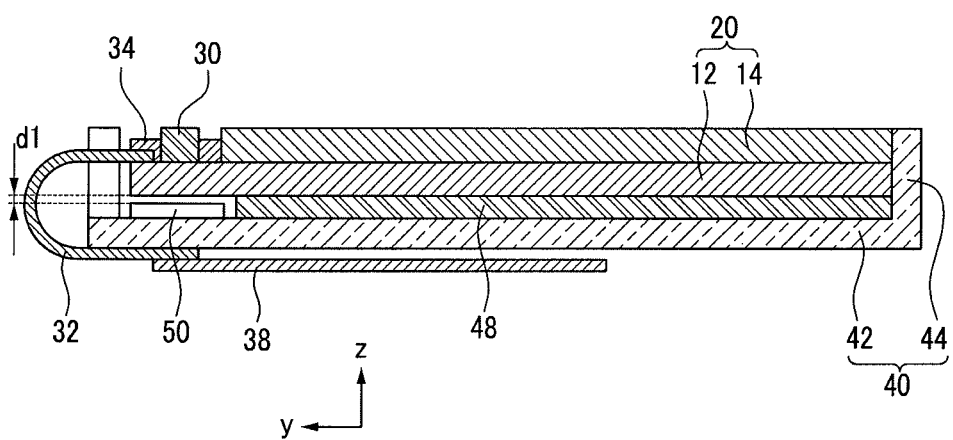
FIG. 3 is a cross-sectional view taken along the line III-III of FIG. 2.

FIG. 1 is an exploded perspective view of an organic light emitting diode (OLED) 100 display according to an embodiment, FIG. 2 is a perspective view showing a state in which a display panel is received at a bezel in FIG. 1, and FIG. 3 is a cross-sectional view taken along the line III-III of FIG. 2.

As shown in FIG. 1 to FIG. 3, an organic light emitting diode (OLED) display according to an embodiment includes a display area A10 and a pad area A20, and has a display panel 20 displaying a predetermined image at the display area A10, a bezel 40 combined to the display panel 20 at the rear of the display panel 20, and a flexible printed circuit (FPC) 36 electrically connected to the display panel 20 through a flexible circuit board 32.

The display panel 20 has a first substrate 12 and a second substrate 14 with a smaller size than the first substrate 12 and fixed to the first substrate 12 by a sealant 13 at an edge thereof. The display area A10 substantially overlapping with the first substrate 12 and the second substrate 14 and actually displaying the image is positioned inside the sealant 13, and the pad area A20 on the first substrate 12 is positioned outside the sealant 13.

Subpixels may be disposed in a matrix format in the display area A10 of the first substrate 12, and a scan driver (not shown) and a data driver (not shown) to drive the subpixels are positioned between the display area A10 and the sealant 13 or outside the sealant 13. Pad electrodes to transmit an electrical signal to the scan driver and the data driver are positioned at the pad area A10 of the first substrate 12.

The second substrate 14 is combined to the first substrate 12 by the sealant 13 with a predetermined interval therebetween such that driving circuits formed in the first substrate 12 and the organic light emitting elements are sealed from the outside for protection. The second substrate 14 may be an upper substrate of the display panel 20, and an absorption agent (not shown) may be attached to the inner surface of the second substrate 14.

In one embodiment, an integrated circuit chip 30 is mounted as a chip-on-glass (COG) type, and the flexible circuit board 32 is mounted as a chip-on-film (COF) type at the pad area A20 of the display panel 20. A protective layer 34 is formed near the integrated circuit chip 30 and the flexible circuit board 32, thereby covering and protecting the pad electrodes formed at the pad area A20.

In the flexible printed circuit (FPC) 36, electronic elements (not shown) to process driving signals are mounted, and a connector 38 to transmit external signals to the flexible printed circuit (FPC) 36 is installed. The flexible circuit board 32 fixed to the pad area A20 is folded into the back side of the bezel 40 such that the flexible printed circuit (FPC) 36 is positioned at the rear surface of the bezel 40.

In the present embodiment, the bezel 40 includes a bottom portion 42 mounted with the display panel 20 and a side wall portion 44 extending from the edge of the bottom portion 42 except for the portion with which the flexible circuit board 32 is contacted toward the display panel 20. The side wall portion 44 is in contact with the side surface of the display panel 20.

The bezel 40 may be formed of a material having excellent strength, for example, stainless use steel (SUS), steel plate cold commercial (SPCC), aluminum, an aluminum alloy, a nickel alloy, and the like, and may be completed through a process in which the side wall portion 44 is bent from the bottom portion 42 at about a 90 degree angle. Also, a cushioning tape 48 is positioned between the bottom portion 42 of the bezel 40 and the display area A10 of the display panel 20 such that the display panel 20 may be fixed to the bezel 40.

A reinforcing member 50 is positioned between the pad area A20 of the display panel 20 and the bottom portion 42 of the bezel 40. In one embodiment, the reinforcing member 50 contacts the bottom portion 42, and the lower surface of the pad area A20 of the display panel 20 and the upper surface of the reinforcing member 50 are separated from each other by a predetermined interval d1. This is to prevent the external impact from being directly transmitted to the pad area A20 of the display panel 20. The reinforcing member 50 may be attached to the bottom portion 42 through welding.

The reinforcing member 50 is enclosed by the cushioning tape 48 and the side wall portion 44 of the bezel 40. In one embodiment, the reinforcing member 50 includes a metallic material such as stainless use steel (SUS), steel plate cold commercial (SPCC), aluminum, an aluminum alloy, and a nickel alloy.

The bezel 40 is combined to the lower surface of the display panel 20 through the cushioning tape 48 thereby having a function of fixing and supporting the display panel 20. In the present embodiment, the reinforcing member 50 is formed at a portion that is mechanically weak because the side wall 44 is not provided, that is, at the bottom portion of the bezel 40 corresponding to the portion with which the flexible circuit board 32 is contacted, in order to increase twisting strength and bending strength of the bezel 40.

Accordingly, in the organic light emitting diode (OLED) display according to the present embodiment, the reinforcing member 50 is formed at the bottom portion 42 of the bezel 40 to provide uniform strength to the whole bezel 40 such that the deformation amount of the bezel 40 may be decreased during the dropping impact. As a result, the twisting and bending applied from the bezel 40 to the display panel 20 is decreased such that the damage to the display panel 20 may be reduced.

Table 1 below shows measurements of damage to an organic light emitting diode (OLED) display after a comparative organic light emitting diode (OLED) display is mounted on a drop jig and the drop jig is released, and Table 2 shows measurements of damage to an organic light emitting diode (OLED) display after an organic light emitting diode (OLED) display according to an embodiment is mounted on a drop jig and the drop jig is released.

TABLE 1

| Division | | #1 | #2 | #3 | #4 | #5 | #6 | #7 | #8 |
|---|---|---|---|---|---|---|---|---|---|
| 1 time | rear side | o | o | o | o | o | o | o | o |
| 1 time | front side | o | x | o | o | o | o | o | o |
| 2 times | rear side | o | | o | o | o | o | o | o |
| 2 times | front side | o | | o | o | o | o | o | o |
| 3 times | rear side | o | | o | o | o | x | x | o |
| 3 times | front side | o | | o | x | x | | | o |
| 4 times | rear side | x | | o | | | | | o |
| 4 times | front side | | | o | | | | | o |
| 5 times | rear side | | | x | | | | | o |
| 5 times | front side | | | | | | | | o |
| 6 times | rear side | | | | | | | | o |
| 6 times | front side | | | | | | | | o |
| 7 times | rear side | | | | | | | | o |
| 7 times | front side | | | | | | | | o |
| 8 times | rear side | | | | | | | | o |
| 8 times | front side | | | | | | | | o |
| 9 times | rear side | | | | | | | | o |
| 9 times | front side | | | | | | | | o |
| 10 times | rear side | | | | | | | | o |
| 10 times | front side | | | | | | | | o |
| Percent OK | result | 30 | 5 | 40 | 25 | 25 | 20 | 20 | 100 |
| Percent OK | average | | | | 33.13 | | | | |

TABLE 2

| Division | | #1 | #2 | #3 | #4 | #5 | #6 | #7 | #8 |
|---|---|---|---|---|---|---|---|---|---|
| 1 time | rear side | o | o | o | o | o | o | o | o |
| 1 time | front side | o | o | o | o | o | o | o | o |
| 2 times | rear side | o | o | o | o | o | o | o | o |
| 2 times | front side | o | o | o | o | o | o | o | o |
| 3 times | rear side | o | o | o | o | o | o | o | o |
| 3 times | front side | o | o | o | o | o | o | o | o |
| 4 times | rear side | o | o | o | o | o | o | o | o |
| 4 times | front side | o | o | o | o | o | o | o | x |
| 5 times | rear side | o | o | o | o | x | x | o | |
| 5 times | front side | o | o | o | x | | | o | |
| 6 times | rear side | o | x | x | | | | o | |
| 6 times | front side | o | | | | | | o | |
| 7 times | rear side | x | | | | | | o | |
| 7 times | front side | | | | | | | o | |
| 8 times | rear side | | | | | | | o | |
| 8 times | front side | | | | | | | o | |
| 9 times | rear side | | | | | | | x | |
| 9 times | front side | | | | | | | | |
| 10 times | rear side | | | | | | | | |
| 10 times | front side | | | | | | | | |
| Percent OK | result | 60 | 45 | 50 | 45 | 40 | 40 | 80 | 35 |
| Percent OK | average | | | | 49.38 | | | | |

The drop height of a drop jig is 1.1 m, the front side faces downward and a drop is performed in "front side", and the rear side faces downward and a drop is performed in "rear side". Eight (#1 to #8) organic light emitting diode (OLED) displays are dropped up to a total of ten times on each of the front side and rear side to determine damage to the organic light emitting diode (OLED) displays.

As shown in Table 1, the comparative organic light emitting diode (OLED) display is damaged when the number of drops is an average of 33.13 percent of the total, however, as shown in Table 2, the organic light emitting diode (OLED) display according to an embodiment is damaged when the number of drops is an average of 49.38 percent of the total. Accordingly, the organic light emitting diode (OLED) display according to the present embodiment that includes the reinforcing member 50 at the bottom portion 42 of the bezel 40 provides uniform strength to the whole bezel 40 such that the deformation amount of the bezel 40 may be minimized during the drop impact, and as a result, the twisting load and the bending load that are applied from the bezel 40 to the display panel 20 are decreased such that damage to the display panel 20 may be reduced.

According to at least one of the disclosed embodiments, the reinforcing member is formed between the pad area of the display panel and the bezel such that the deformation of the portion corresponding to the pad area of the display panel among the bezel may be prevented during an external impact, and thereby the twisting strength and the bending strength may be improved.

While the disclosed embodiments have been described with reference to the accompanying drawings, it is to be understood that the disclosed embodiments are not considered limiting. Further, various modifications and equivalent arrangements are included within the spirit and scope of the appended claims.

What is claimed is:

1. An organic light emitting diode (OLED) display comprising:
   a display panel including i) a display area configured to display an image and ii) a pad area adjacent to the display area and configured not to display an image;
   a bezel configured to receive the display panel; and
   a substantially linear reinforcing member positioned in its entirety between the pad area of the display panel and the bezel.

2. The organic light emitting diode (OLED) display of claim 1, wherein a lower surface of the pad area of the display panel and an upper surface of the reinforcing member are separated from each other by a predetermined interval.

3. The organic light emitting diode (OLED) display of claim 1, further comprising: a cushioning tape positioned between the display area of the display panel and the bezel.

4. The organic light emitting diode (OLED) display of claim 3, wherein the bezel includes:
   a bottom portion; and
   a side wall portion protruding from the edge of the bottom portion, and wherein the reinforcing member contacts the bottom portion.

5. The organic light emitting diode (OLED) display of claim 4, wherein the reinforcing member is enclosed by the cushioning tape and side wall portion of the bezel.

6. The organic light emitting diode (OLED) display of claim 1, wherein the reinforcing member includes a material selected from the group consisting of stainless steel, steel plate cold commercial, aluminum, an aluminum alloy, and a nickel alloy.

7. The organic light emitting diode (OLED) display of claim 1, wherein the reinforcing member is formed directly below and does not contact the pad area of the display panel.

8. The organic light emitting diode (OLED) display of claim 1, further comprising a flexible circuit board at least partially surrounding the bezel, the reinforcing member and the pad area, wherein the flexible circuit board does not contact the reinforcing member.

9. The organic light emitting diode (OLED) display of claim 1, wherein the reinforcing member is formed substantially directly below the pad area.

10. The organic light emitting diode (OLED) display of claim 9, wherein a vertical gap is formed between the reinforcing member and the pad area.

* * * * *